United States Patent [19]
Orme

[11] 3,768,376
[45] Oct. 30, 1973

[54] FAIL-SAFE SERVO CONTROL VALVE

[75] Inventor: Myrl E. Orme, Canoga Park, Calif.

[73] Assignee: The Bendix Corporation, North Hollywood, Calif.

[22] Filed: May 16, 1972

[21] Appl. No.: 253,749

Related U.S. Application Data

[63] Continuation-in-part of Ser. No. 129,933, March 31, 1971, abandoned.

[52] U.S. Cl. ............... 91/466, 137/596, 137/625.69
[51] Int. Cl. ... F15b 11/08, F15b 13/04, F16k 11/00
[58] Field of Search .................... 91/363 A, 466; 137/596, 625.68, 625.69, 625.48

[56] References Cited
UNITED STATES PATENTS

| | | | |
|---|---|---|---|
| 2,702,529 | 2/1955 | Doerfner | 137/625.69 |
| 2,771,907 | 11/1956 | Joy | 137/625.48 X |
| 3,253,613 | 5/1966 | Richolt | 91/466 X |
| 3,439,707 | 4/1969 | York et al. | 137/596 |

Primary Examiner—Irwin C. Cohen
Attorney—Robert C. Smith et al.

[57] ABSTRACT

A fail-safe servo control valve having an improved valve labyrinth, which is developed by suitably grooved and ported and selectively movable valve components, that eliminates system fluid "short circuit" paths through the labyrinth so that effective output control is maintained in the event that a valve component becomes stuck or jammed.

3 Claims, 5 Drawing Figures

FAIL-SAFE SERVO CONTROL VALVE

CROSS REFERENCE TO RELATED APPLICATION

This is a continuation-in-part of Application Ser. No. 129,933, filed Mar. 31, 1971, and now abandoned.

BACKGROUND OF THE INVENTION

Servo mechanisms or systems, such as aircraft flight control systems, control large amounts of output power by means of small amounts of input power which acts through a servo control valve. In flight control systems, the control valve supplements a comparatively feeble input force with a high pressure fluid system and develops a strong, yet accurately controlled, output force. The control valve is in effect a leash on the output force. When leashed, the controlled output force provides beneficial results; unleashed, the uncontrolled output force can be disastrous, particularly when the output force actuates an aircraft flight control system or the like.

Fail-safe, servo control valves have been developed and are known in the prior art. See U. S. Pat. No. 3,253,613 granted May 31, 1966. The prior art control valve enables an operator to override a stuck control valve slide or spool and maintain marginal control of the valve. However, the prior art control valve can develop a fluid "short circuit" from a high pressure source of system fluid to a low pressure reservoir of system fluid. High pressure fluid is permitted to dump through the control valve labyrinth to the low pressure reservoir which relieves the fluid pressure on one side of an actuating cylinder that develops the desired output force to actuate, for example, an aircraft flight control system. This permits the in-flight control surface to blow down to a "trail" condition which essentially relieves the stuck or jammed condition. However, the desired fluid flow to the actuating cylinder, which would drive the aircraft control system from an extreme and dangerous control position to a normal and desired control position, is reduced to a minimal, if any, total control effect.

OBJECTS OF THE INVENTION

Accordingly, it is an object of the invention to provide a new and improved fail-safe servo control valve.

It is an object of the invention to provide a control valve that substantially eliminates the provability of short-circuit fluid paths therein which can result in loss of system control.

It is an object of the invention to provide a control valve that substantially eliminates the probability of short-circuit fluid paths and maintains effective control over any system in which said valve is used.

While the specification concludes with claims particularly pointing out and distinctly claiming the subject matter which may be regarded as the invention, the organization and method of operation, together with further objects, features, and the attending advantages thereof, may best be understood when the following description is read in connection with the accompanying drawings.

DESCRIPTION OF THE INVENTION

Figure 1:
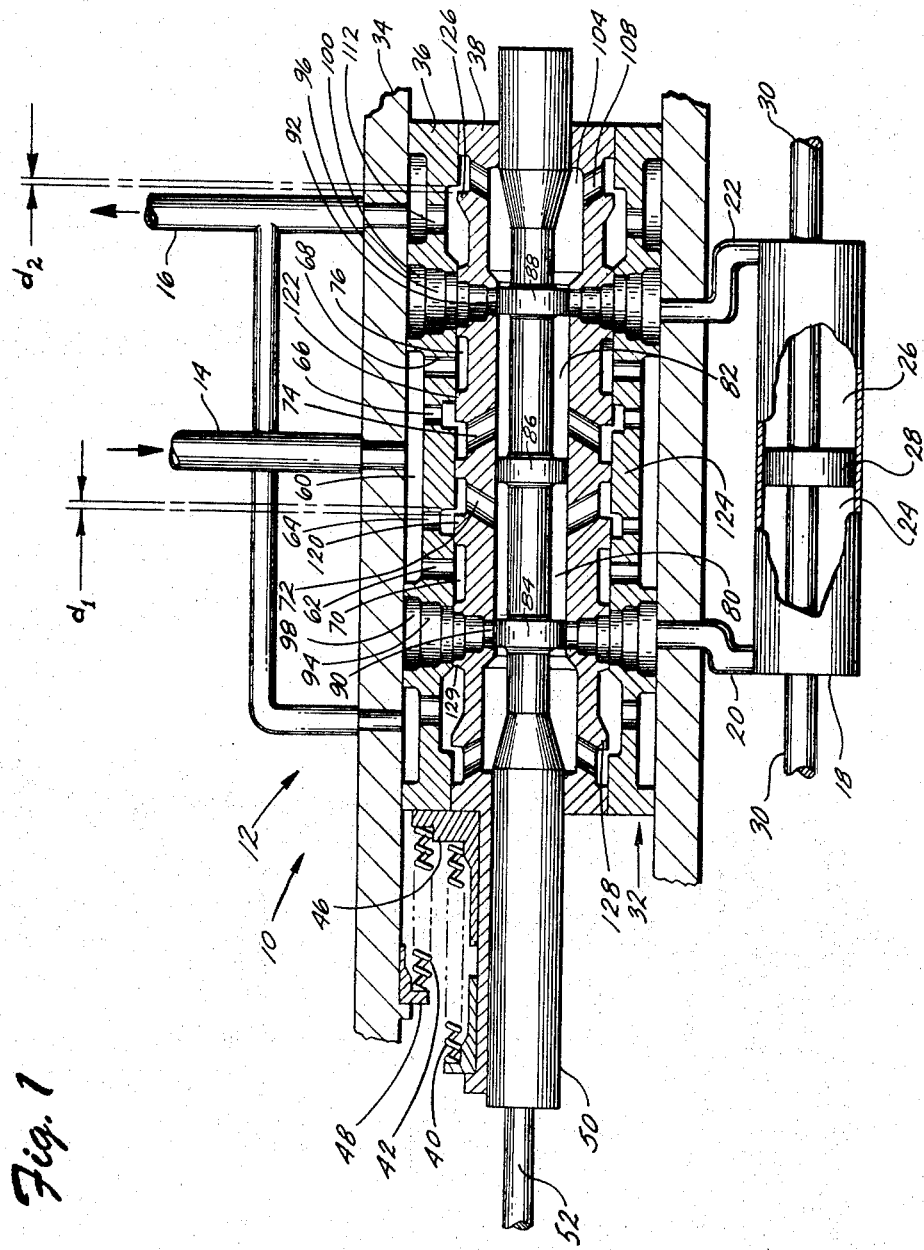
FIG. 1 is a diagrammatic view of a control system having one form of fail-safe servo control valve, according to my invention, which is shown partly in section and in a null position.

One form of control valve 10 formed in accordance with the invention is shown by FIG. 1 connected into a control system 12 such as a flight control system for an aircraft. A high pressure source (not shown) of system fluid is connected to the control valve 10 by inlet conduit 14, and a low pressure reservoir (not shown) of system fluid is connected to the control valve by return conduit 16. Control valve 10 directs and proportions the flow of system fluid to and from an actuating cylinder 18 through cylinder conduits 20 and 22 that individually open into respective chambers 24 and 26 within the actuating cylinder as developed therein by a power piston 28. The selective flow of system fluid to and from the actuating cylinder 28 drives the power piston 28 either to the right or to the left from the null position as shown by FIG. 1. The power piston 28 is connected by rod 30 to a control system member (not shown) that can be, for example, one of the flight control surfaces of an aircraft.

The control valve 10 directs and proportions the flow of system fluid to and from the actuating cylinder 18 by the selective positioning of one or more components of a spool-and-sleeve assembly 32 enclosed within a control valve housing 34.

The spool-and-sleeve assembly 32 as shown by FIG. 1 has an unmovable outer fixed sleeve 36 secured to the housing 34. An inner sleeve 38 is positioned within the outer fixed sleeve 36 and retained in the null position as shown by FIG. 1 under normal control valve operating conditions by the coaction of a pair of concentrically arranged springs 40 and 42. Spring 40 is retained between a spring collar 44 that is secured to the inner sleeve 38, and a spring collar 46 that is positioned on the inner sleeve. Spring 42 is retained between spring collar 46 and collar 48 that is secured to the control valve housing 34. The coaction of springs 40 and 42 continuously urges the spring collar, under the predetermined compression loading of the concentric springs, against the outer fixed sleeve 36 and the inner sleeve 38. This coactive force maintains a desired operating alignment between the inner and outer sleeves 36 and 38 under normal operating conditions, yet permits the selective displacement of the inner sleeve 38 relative to the outer sleeve 36 under abnormal operating conditions as described hereinafter.

The spool-and-sleeve assembly 32 further includes a primary valve spool 50 that slides within the inner sleeve 38 and is selectively positioned relative to the inner sleeve by means of a schematically illustrated actuator 52 that can be connected, for example, to the flight controls of an aircraft. Movement of the actuator 52 selectively displaces the valve spool 50 either to the right or to the left from the null position as shown by FIG. 1, and under normal operating conditions is the only moving component in the spool-and-sleeve assembly 32. The valve spool 50 can be selectively displaced along with a selective displacement of inner sleeve 38 so that the inner sleeve can be displaced or exercised, for example, during a ground check-out of the system to remove any contaminants such as dirt and to insure that the inner sleeve is not stuck or jammed.

The spool-and-sleeve assembly 32 develops several fluid paths, as described hereinafter, through the assembly that are selectively opened or blocked by the positioning of the valve spool 50 relative to the inner sleeve 38 under normal operating conditions, and by the positioning of the valve spool 50 and the inner sleeve 38, moving as a unit, relative to the outer fixed sleeve 36 under abnormal operating conditions.

In the null position as shown by FIG. 1, high pressure system fluid is introduced through inlet conduit 14 into an annular chamber 60 developed between the housing 34 and the outer fixed sleeve 36. Annular chamber has radial passages or ports 62, 64, 66 and 68 that are normally aligned respectively with annular groove 70, radial passage 72, radial passage 74 and annular groove 76 of the inner sleeve 38. Radial passages 72 and 74 pass the high pressure system fluid into similar annular chambers 80 and 82, respectively, that are developed by spaced land or flange portions 84, 86 and 88 that are suitably formed on valve spool 50.

Land portions 84 and 88 of valve spool 50 close or block radial cylinder passages 90 and 92, respectively, of the inner sleeve 38 in the null position of FIG. 1. Radial passages 90 and 92 are aligned with radial passages 94 and 96, respectively, of the outer sleeve 36 and open into annular cylinder grooves 98 and 100, respectively, suitably formed in the outer sleeve. Annular cylinder groove 98 is open to cylinder conduit 20 and the associated cylinder chamber 24 of the actuating cylinder 18. Similarly, annular cylinder groove 100 is open to conduit 22 and the associated cylinder chamber 26.

The aligned grooves and radial passageways in the null position as shown in FIG. 1, as described hereinbefore, prevent fluid communication between the physically separated high pressure system fluid, cylinder fluid, and low pressure system fluid. Certain lands developed between the adjacent fluid passages complement the physical separation of the fluids; however, for purposes of the invention and the clear description thereof, lands 120 and 122 that are formed on the inner sleeve and which assist in constraining the high pressure system fluid as it passes from radial passages 64 and 66 into the annular chambers 80 and 82, respectively, will be described since the selective positioning of lands 120 and 122 relative to land portion 86 of valve spool 50 and an outer sleeve ligament 124 contributes to the functioning of the form of the invention shown by FIG. 1. Lands 120 and 122 cooperate with and are axially spaced from outer sleeve ligament 124 so that radial passages 64 and 66 are substantially covered or blocked by the respective lands 120 and 122. FIG. 1 illustrates the relatively small and finite distance $d_1$ which separates the ligament 124 from the lands 120 and 122. Also, the distance $d_2$ represents the small distance between a land 126 on inner sleeve 38 and a mating cylindrical surface on the inner bore of outer sleeve 36. A similar clearance exists between a land 128 at the opposite end of at the opposite end of inner sleeve 38 and a mating cylindrical surface on the inner bore of sleeve 36. It is understood that the total areas at any selected point along a given fluid passage, as well as the effective areas of the several piston surfaces, are predetermined in accordance with conventional control valve design and operating parameters so that balanced system forces and unbalanced system forces as desired are readily obtained.

Figure 2:
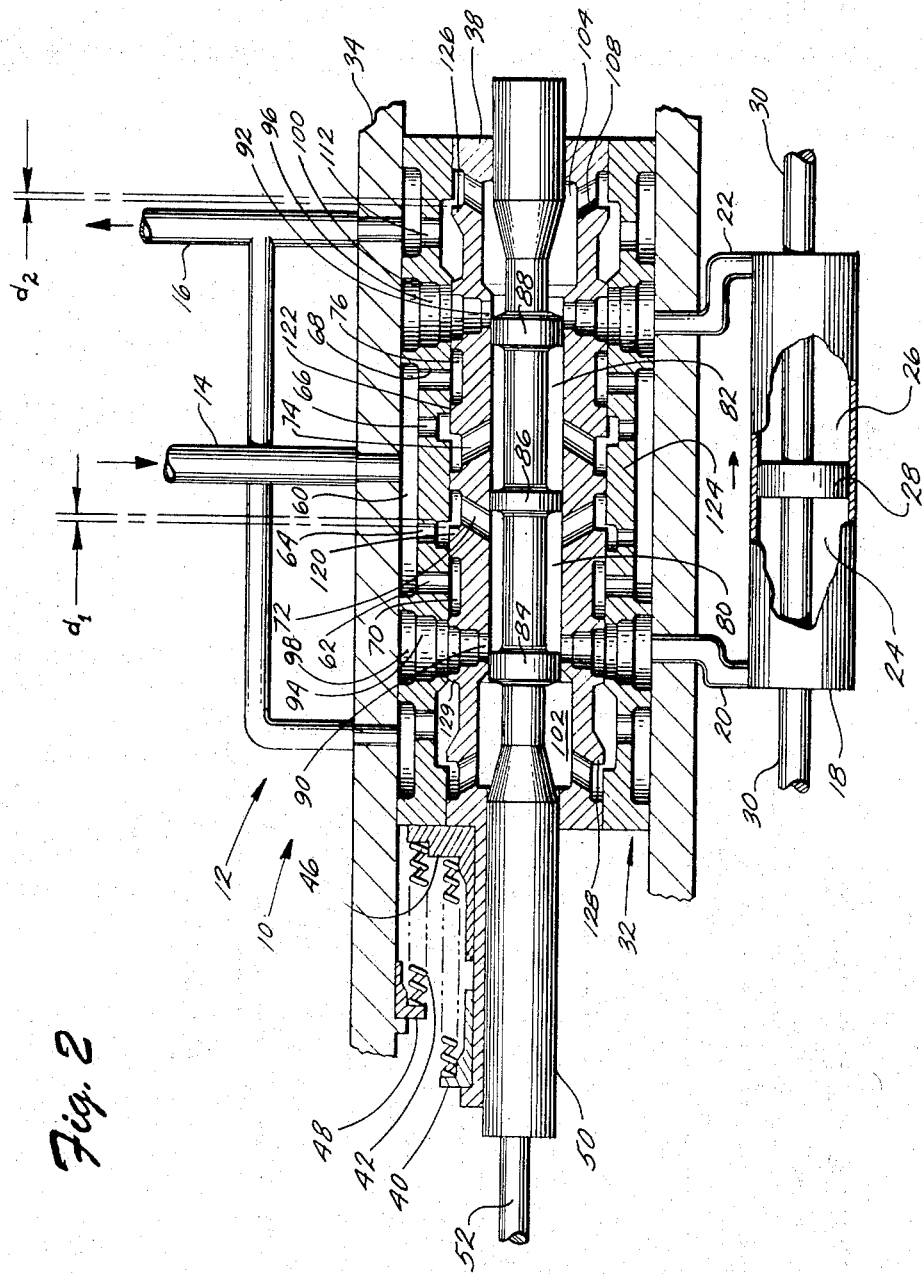
FIG. 2 is the system of FIG. 1 where the control valve is shown in an off-null position which represents both an actuating position and a non-actuating or stuck position for purposes of description.

Referring to FIG. 2, normal operation of the control valve 10 moves the valve spool 50, either to the right or to the left from the null position as shown by FIG. 1, through movement of the actuator 52. In FIG. 2, the actuator has moved the spool 50 to the left from the null position. This permits the high pressure system fluid to pass into cylinder passage 90 from passage 80 as the primary valve spool land 84 uncovers passage 90. The high pressure system fluid passes through cylinder conduit 20 into cylinder chamber 24 of the actuating cylinder. Simultaneously, system fluid passes from cylinder chamber 26 to the return line 16 as valve spool land 88 uncovers cylinder passage 92. The system fluid is then permitted to pass sequentially through conduit 22, annular cylinder groove 100, radial passage 96, cylinder passage 92, valve spool chamber 104, groove and radial passage 108, and past land 126 and groove and radial passage 112.

The introduction of high pressure system fluid into cylinder chamber 24 and the opening of cylinder chamber 26 to the low pressure system fluid through return conduit 16 forces the power piston 28 of the actuating cylinder 18 to move to the right from the null position as viewed in FIG. 2. Rod 30 is moved by the piston 28 and is connected, for example, to the previously described control system.

Figure 3:
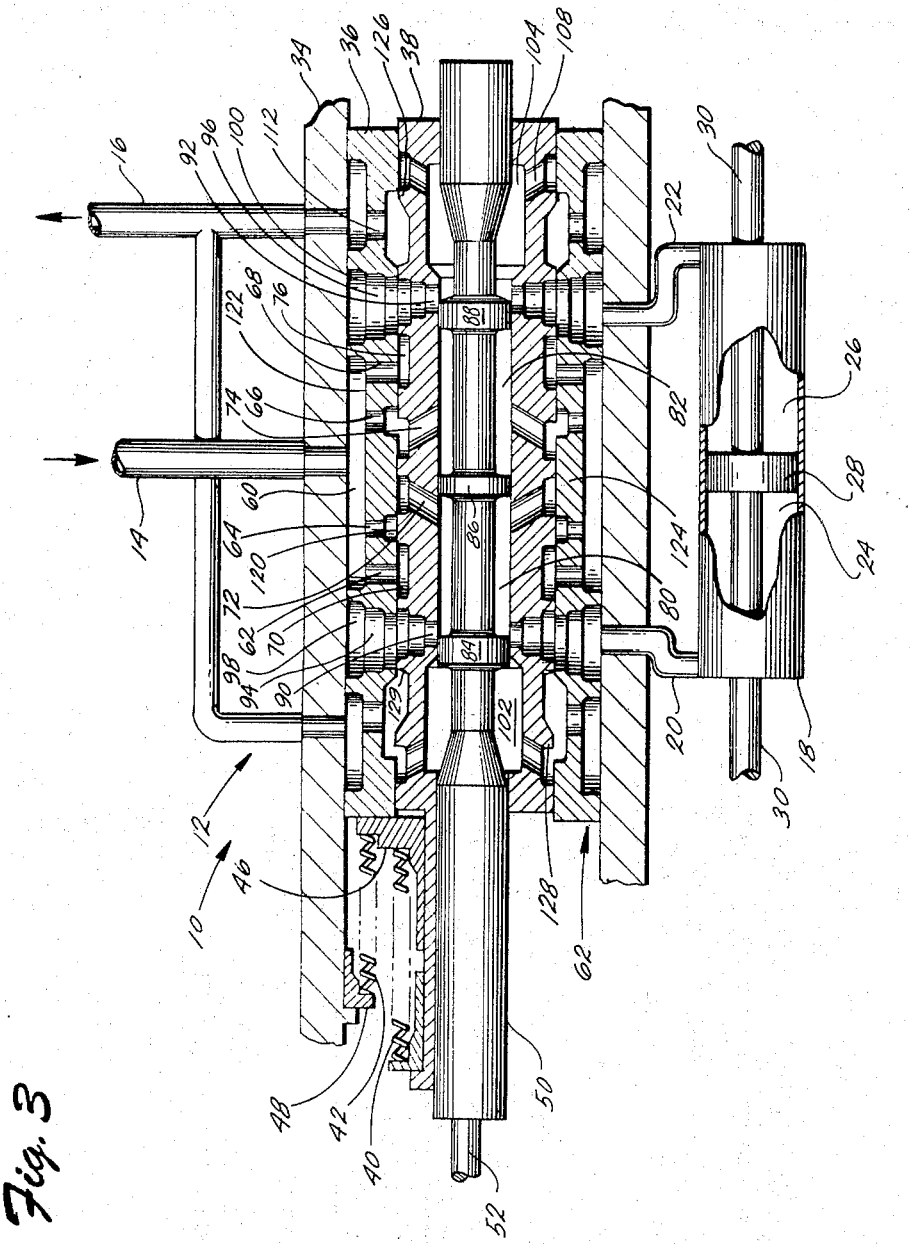
FIG. 3 is the system of FIG. 1 where the control valve has been returned to an effective null position.

Referring to FIG. 3, situations can arise during the normal operation of a control valve, such as control valve 10, where the primary valve spool 50 will stick due to contamination in the system fluid, warpage of the control valve components, or physical damage, or the like. Assuming for example that the valve spool 50 has seized within sleeve 38 in the operating position as shown by FIG. 2, as described hereinbefore, the actuator 52 moves not only the primary valve spool 50 but also the inner sleeve 38 as a unit to the right as viewed in FIG. 3 by overcoming the spring loading placed on the inner sleeve 38 by spring 40. Movement of the unit to the left as viewed in FIG. 3, assuming that the valve spool 50 had stuck in an off-null position to the right of that as shown by FIG. 1, would overcome the spring loading of spring 42 on the inner sleeve 38.

Figures 4, 5:
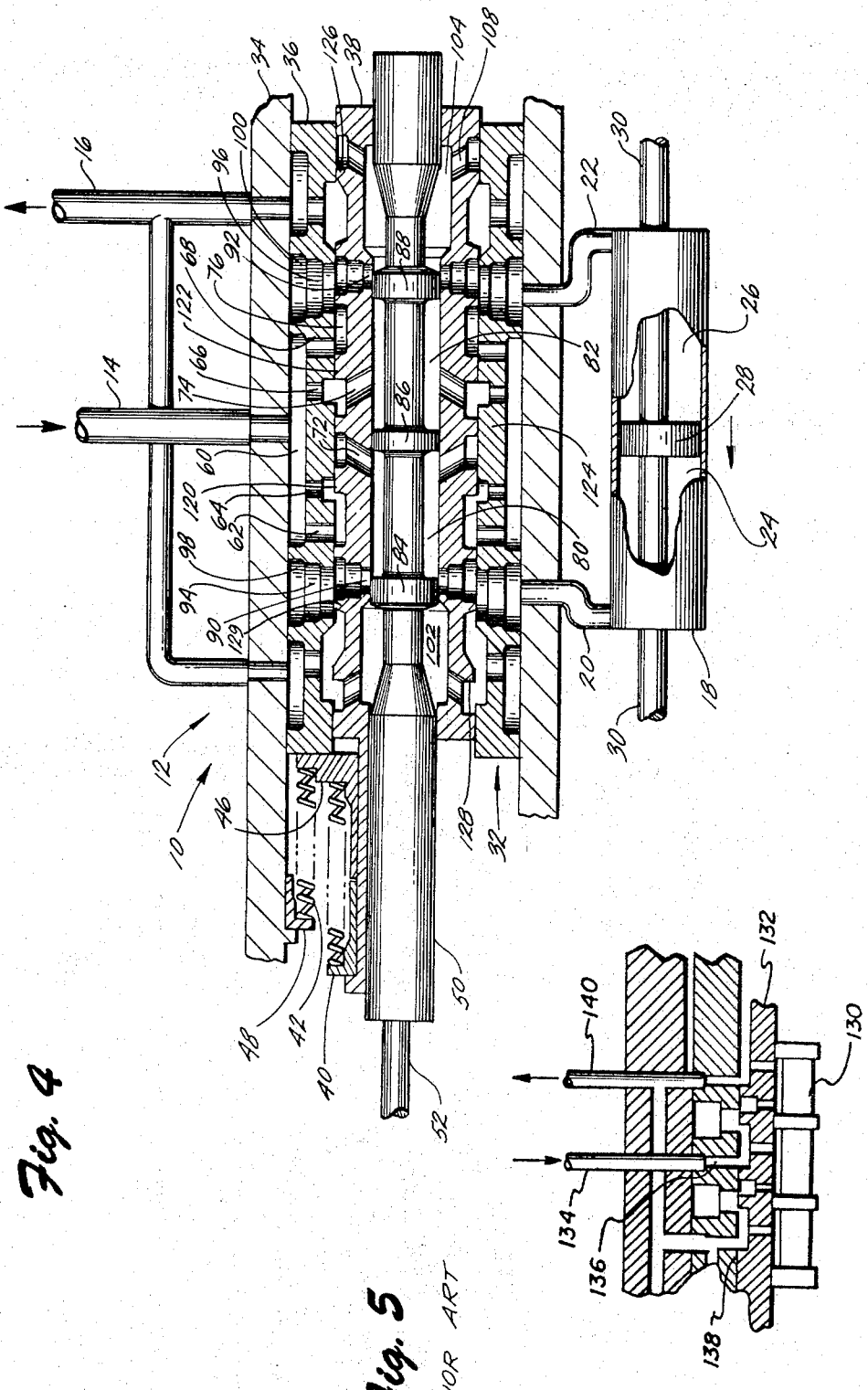
FIG. 4 is the system of FIG. 1 moved beyond the position of FIG. 3 to reach an actuating position opposite to that of FIG. 2.
FIG. 5 is a schematic view of a prior art control valve in an off-null position which represents a stuck valve position.

Restoring movement for the finite distance $d_1$ as shown by FIGS. 1 and 2 moves land 120 of the inner sleeve 38 relative to outer sleeve 36 and covers or blocks radial passage 64. When radial passage 64 is blocked, high pressure system fluid can no longer pass from high pressure annular chamber 60 through chamber 80 into cylinder passage 90. FIG. 4 shows the control valve with elements 50 and 38 seized together as in FIG. 3, but with the input force on actuator 52 increased to carry these valve elements farther to the right, thus opening a flow path from chamber 60 through passageway 68, annulus 76, passage 96, groove 100, and passage 22 to chamber 26 which causes it to move piston 28 toward the left. At the same time, the fluid in chamber 24 returns through conduit 20, annulus 98 and port 94 and past a land 129 on valve element 38 to return conduit 16. This provides continuous control over the positioning of the power piston 28 in the actuating cylinder 18 and, thus, continuous control over, for example, a control system member connected to the power piston rod 30.

In the known prior art control valves, for example, as shown by FIG. 5, similar movement of a primary valve spool 130 and inner sleeve 132 as a unit permits a "short circuit" to develop from the high pressure system fluid source (not shown) passing through inlet conduit 134 into a cylinder passage 136, between the center lands of valve 130, and finally to return passage 138 which connects with return conduit 140 and the low pressure system fluid source (not shown). This short circuit dumps the high pressure fluid directly to the low pressure side of the system which relieves the fluid pressure on one side of an actuating cylinder which develops the desired output force similar to that which has been previously described and illustrated. Where the output force is used to actuate an aircraft flight control system, the in-flight control surface can blow down to a "trail" position leaving a minimal, if any, total control effect to counteract and reposition the control surface.

As will be evidenced from the foregoing description, certain aspects of the invention are not limited to the particular details of construction as illustrated, and it is contemplated that other modifications and applications will occur to those skilled in the art. It is, therefore, intended that the appended claims shall cover such modifications and applications that do not depart from the true spirit and scope of the invention.

I claim:

1. A fail-safe fluid control system comprising:
   a. a valve housing including a fixed sleeve member having a plurality of passages and lands,
   b. first and second fluid passageways connected to said housing for inlet and return of fluid, respectively,
   c. an actuating cylinder means,
   d. third and fourth fluid passageways connected between said housing and said cylinder means for selected inlet and return of fluid therebetween,
   e. first and second valve means normally in a centered position movable within said fixed sleeve member and normally movable relative to each other for selectively controlling fluid flow from said first and second passageways to said third and fourth passageways,
   f. said first valve means being annular and having a chamber therein and having a plurality of passageways and a plurality of lands and said second valve means being slidable within said first valve means and including a center land and a plurality of other lands with spaces between defining a plurality of passageways,
   g. resilient means continuously urging said first valve means into a predetermined normal centered operating position relative to said housing,
   h. said first and second valve means being movable as a unit overcoming said resilient means when sticking occurs, and said second valve means in said centered position having outer lands thereof blocking said third and fourth fluid passageways, said first valve means in said centered position having lands thereof spaced from lands on said fixed sleeve member forming passageways to provide said first passageway communication with said spaces on opposite sides of said center land of said second valve means between said outer blocking lands and to provide said second passageway communication with spaces between other of said lands of said second valve means and said other blocking lands, whereby any short circuit paths between said first passageway and said second passageway are effectively blocked.

2. The fluid control system of claim 1 in which said resilient means are first and second springs having a predetermined compression loading.

3. The fluid control system of claim 2 in which said first and second springs have respective first and second ends, said first end of said first spring connected to said housing, said first end of said second spring connected to said first valve means, said second ends of said first and second springs connected together by a collar means and slidable relative to said housing and said first valve means with said fixed sleeve defining an alignment stop for said first valve means in said normal centered operating position.

* * * * *